(12) United States Patent
Hüttermann et al.

(10) Patent No.: US 6,733,559 B1
(45) Date of Patent: May 11, 2004

(54) METHOD OF REDUCING THE AVAILABILITY OF HEAVY METALS IN PLANTS AND THE USE OF CROSS LINKED POLY(METH)ACRYLATES IN SAID METHOD

(75) Inventors: Aloys Hüttermann, Göttingen (DE); Moitoba Zomorrodi, Göttingen (DE)

(73) Assignee: Stockhausen GmbH, Krefeld (DE)

( * ) Notice: Subject to any disclaimer, the term of this patent is extended or adjusted under 35 U.S.C. 154(b) by 0 days.

(21) Appl. No.: 09/647,108

(22) PCT Filed: Mar. 24, 1999

(86) PCT No.: PCT/EP99/02008

§ 371 (c)(1),
(2), (4) Date: Jan. 22, 2001

(87) PCT Pub. No.: WO99/48360

PCT Pub. Date: Sep. 30, 1999

(30) Foreign Application Priority Data

Mar. 26, 1998 (DE) .......................................... 198 13 425

(51) Int. Cl.$^7$ .............................................. C09K 17/22
(52) U.S. Cl. .......................... 71/27; 588/231; 588/236; 423/1; 423/85; 423/89; 405/128.5; 405/128.75; 405/128.45; 405/129.55; 405/264
(58) Field of Search .......................... 71/27; 423/1, 85, 423/89; 588/231, 236; 405/128.5, 128.45, 129.55, 128.75, 264

(56) References Cited

U.S. PATENT DOCUMENTS

| | | | | |
|---|---|---|---|---|
| 4,334,905 A | * | 6/1982 | Wagner et al. .................. | 71/27 |
| 4,755,205 A | * | 7/1988 | Nille .............................. | 71/6 |
| 5,028,252 A | * | 7/1991 | Kaes ............................. | 71/29 |
| 5,244,492 A | * | 9/1993 | Cyr ............................. | 209/167 |
| 5,405,425 A | * | 4/1995 | Pieh et al. | |
| 5,501,973 A | * | 3/1996 | Mayfield ..................... | 435/244 |
| 5,651,895 A | * | 7/1997 | Gordon ....................... | 210/709 |
| 5,967,965 A | * | 10/1999 | Vyshkina et al. ............. | 134/13 |
| 6,210,078 B1 | * | 4/2001 | Redwine et al. .............. | 134/28 |

FOREIGN PATENT DOCUMENTS

| | | | |
|---|---|---|---|
| EP | 0072213 | * | 2/1983 |
| EP | 0072214 A1 | * | 2/1983 |
| EP | 0101253 A2 | * | 2/1984 |

OTHER PUBLICATIONS

Torres et al., Soil Use and Management, vol. 14, pp. 106–110, 1998.*
"Multiple Metal Cations Removed in Single Pass", High Tech Separations News, vol. 10, No. 10, pp. N/A, Mar. 1998.*

* cited by examiner

Primary Examiner—C. Sayala
(74) Attorney, Agent, or Firm—Cohen, Pontani, Lieberman & Pavane

(57) ABSTRACT

A process for reducing plant availability of heavy metals in substrates such as soils wherein the substrates treated with cross-linked polymethacrylates. The poly (meth)acrylates can be worked into the soils.

17 Claims, 6 Drawing Sheets

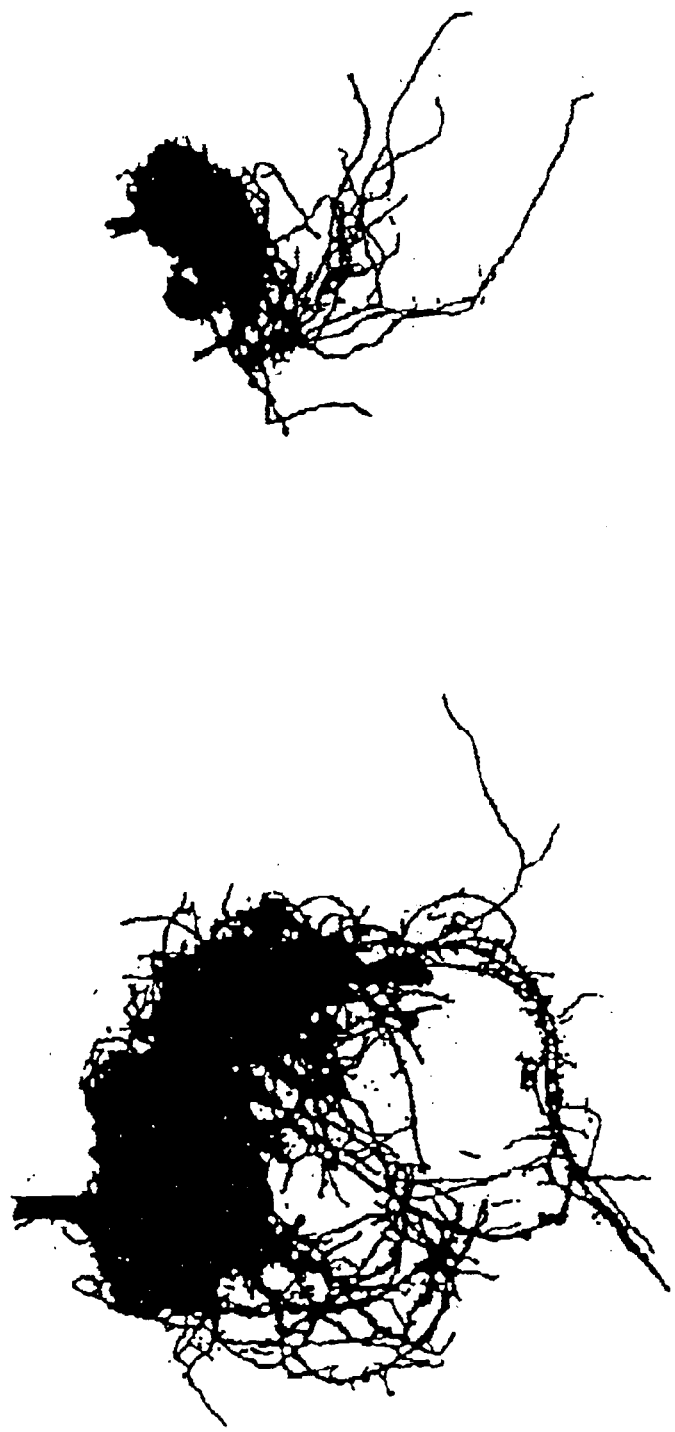
FIG. 6 — ROOT SYSTEM OF SPRUCE WHICH ARE GROWN IN LEAD-CONTAINING SOIL TREATED WITH STOCKABSORB (LEFT) IN COMPARISON TO UNTREATED CONTROL (RIGHT)

METHOD OF REDUCING THE AVAILABILITY OF HEAVY METALS IN PLANTS AND THE USE OF CROSS LINKED POLY(METH)ACRYLATES IN SAID METHOD

BACKGROUND OF THE INVENTION

1. Field of the Invention

The present invention relates to a process for reducing plant availability of heavy metals and the use of cross-linked poly(meth)acrylates in said process.

2. Background of the Invention

Until now, no method is known by which it has been possible to eliminate the effect of heavy metals on plants in soils contaminated with heavy metals.

At present, two methods are used for planting crops in fields containing heavy metals: either top soil is added to the contaminated soils, or the contaminated soil is stripped away and replaced by top soil, in which case the new top soil layer must usually be more than one meter in thickness. All these methods require much effort and are very expensive.

Experiments conducted so far to reduce plant availability of heavy metals by adding polyacrylates have either been unsuccessful (O. A. El-Hady, A. A. Lotfy, B. M. A. El-Hady, Egyptian Journal of Soil Science, 30:4, 545–557, 1990) or had the effect that the availability of heavy metals such as lead, nickel, manganese or iron was clearly increased (R. L. Mikkelsen, Fertiliser Research 41, 87–92 [1995]; J. J. Mortvedt, R. L. Mikkelsen, J. H. Kelsoc, Soil Science Society of America Journal, 56:4, 1319–1324 [1992]; F. Awal, L. Kluge, R. Kluge, J. Abadia in Iron Nutrition in Soils and Plants, Proceedings of the Seventh International Symposium, Zaragoza, Spain, Jun. 27 to Jul. 2, 1993, Kluwer Academic Publishers: Dordrecht, 1995, 53–62; J. J. Mortvedth, R. L. Mikkelsen, A. D. Behel Jr., Journal of Plant Nutrition, 15:10, 1913–1926 [1992].

EP 415 141 discloses soil conditioners consisting of super-absorbers containing sulfonic acid which have a high water retention ability even after the repeated absorption/desorption of saline solutions. As a result, heavy-metal ions are released into the plants and are not retained for long periods.

EP 72 213 A describes the use of super-absorbers with a hydration rate of 16–80% in mixtures of free-flow agents for the improvement of water retention or aeration. This document provides no information about working cross-linked polyacrylates into the soil for the long-term absorption of heavy metals.

SUMMARY OF THE INVENTION

Surprisingly it was found that when cross-linked poly(meth)acrylates are added to substrates contaminated with heavy metals, the plant availability of heavy metals is distinctly reduced or even completely eliminated.

Heavy metals contained in the substrates are captured by the negatively charged carboxyl groups of the poly(meth)acrylates, which means that they are no longer available to the plants. This effect remains active over a long period of time, surprisingly as long as many months. In particular, this was unexpected by persons skilled in the art, and it allows a long-term elimination of the effect which heavy metals have in contaminated soils.

The substrates, such as soils or hydrocultures, are treated with the cross-linked poly(meth)acrylates, in particular by mixing in quantities of 0.1% to 2.5% in relation to the total substrate weight, preferably quantities of 0.5% to 2.0%, in particular about 0.2% to 0.8%, and specifically 0.4% to 0.6%.

The soil is excavated to a depth of up to about 50 cm, preferably 30 cm, and in particular about 40 cm, and mixed with the poly(meth)acrylates.

BRIEF DESCRIPTION OF THE DRAWINGS

In the drawings

FIG. 6 shows the root stock of spruce grown in lead-contaminated soil treated and untreated.

BRIEF DESCRIPTION OF THE PRESENTLY PREFERRED EMBODIMENTS

Figure 1:
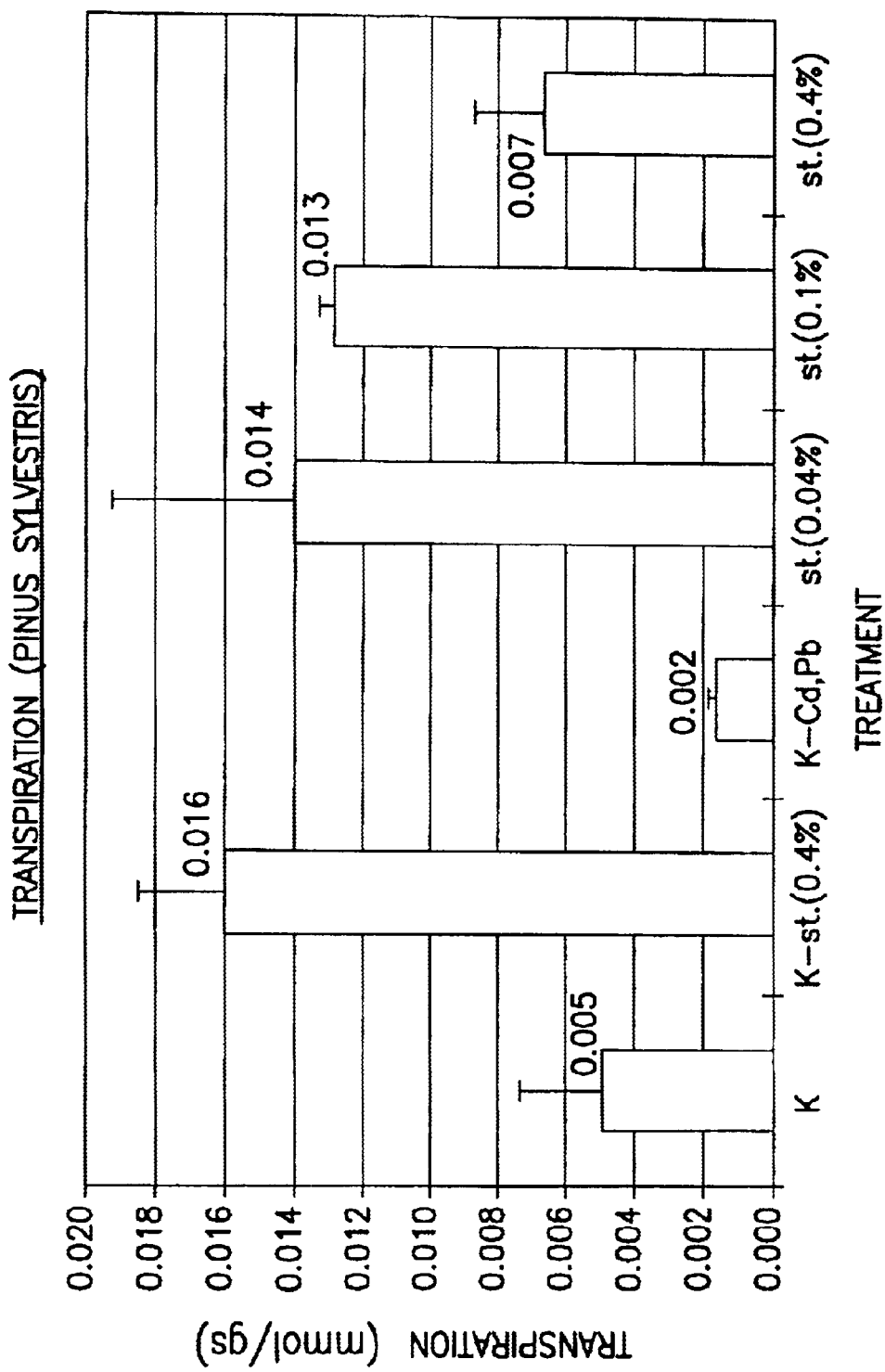
FIG. 1 shows the transpiration rates.
Figure 2:
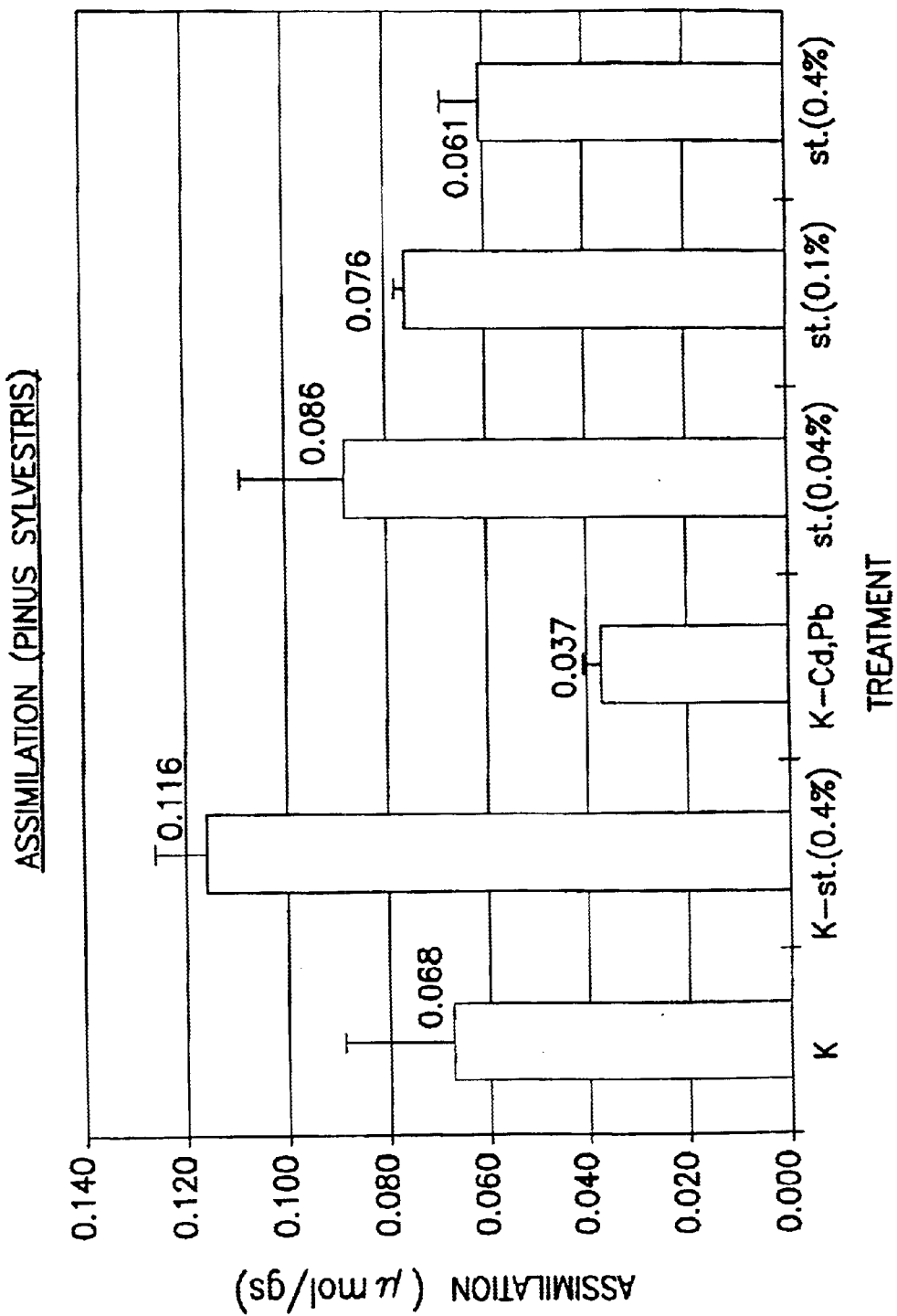
FIG. 2 shows assimilation.
Figure 3:
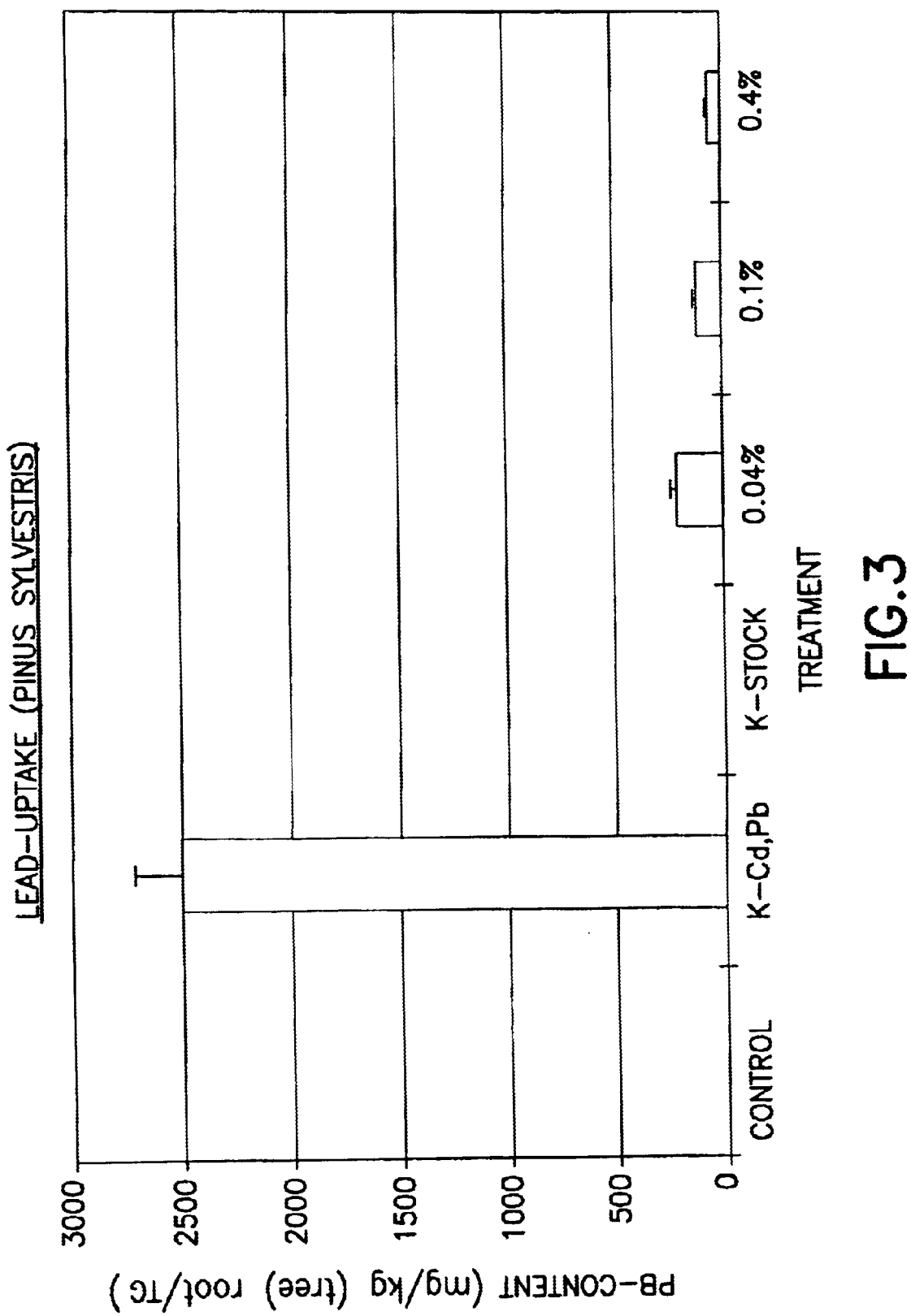
FIG. 3 shows the absorption of lead.
Figure 4:
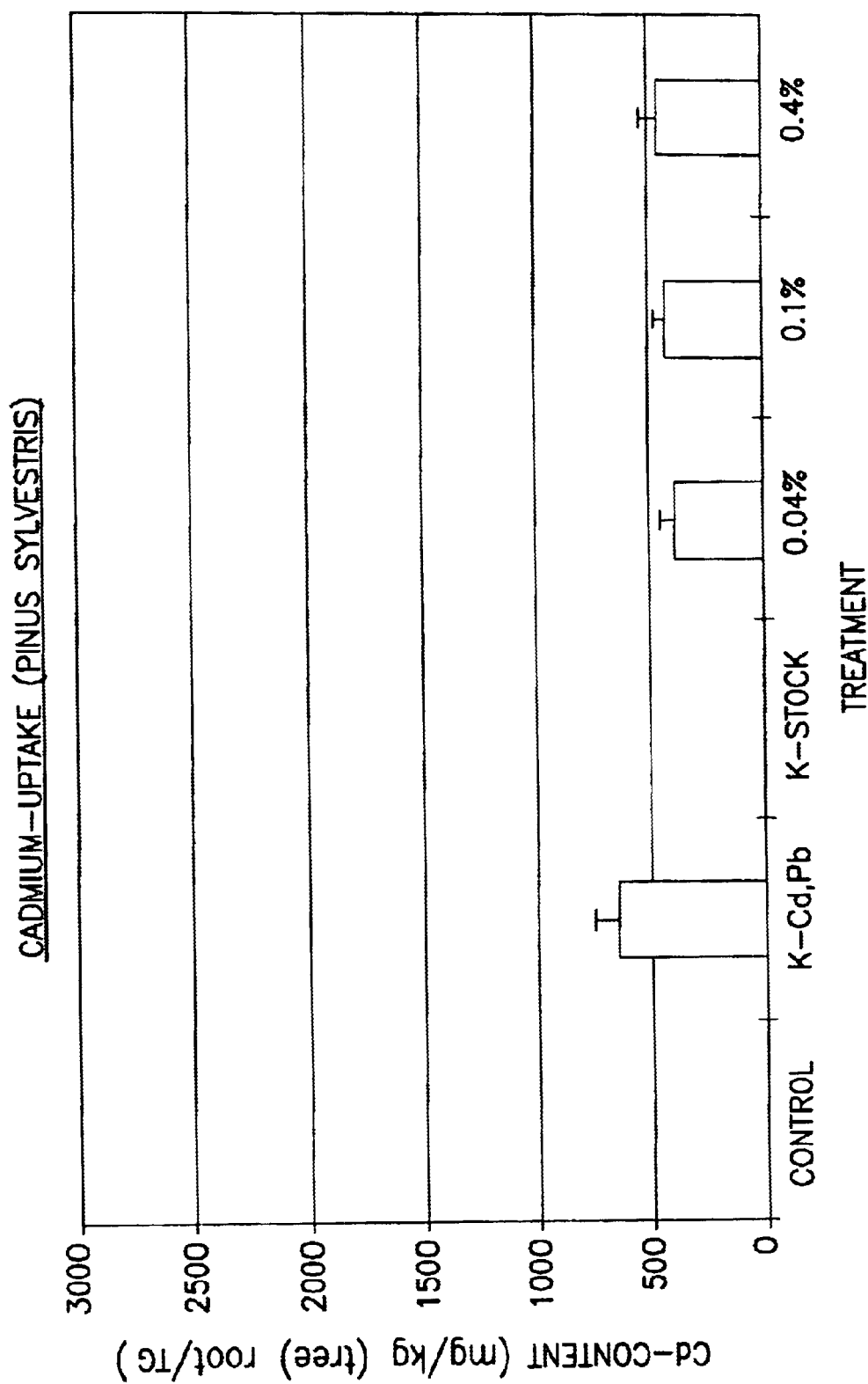
FIG. 4 shows the absorption of cadmium, each determined in the various experimental variants.

Suitable poly(meth)acrylates that can be used according to the invention are all cross-linked poly(meth)acrylates which contain carboxylate groups and form hydrogels.

Particularly to be used according to the invention are poly(meth)acrylates which contain carboxylate groups and consist primarily and preferably of the monomers acrylic acid, acrylamide, methacrylic acid and methacrylamide, but also other water-soluble monomers such as acrylonitril, methacrylonitril, N,N-dimethylacrylamide, vinyl pyridine and other water-soluble polymerizing acids and their salts, in particular maleic acid, fumaric acid, itaconic acid, vinylosulfonic acid or acrylamidomethylopmpanosulfanic acid; also the esters which contain hydroxy groups and belong to the polymerizing acids, in particular the hydroxyethyl esters and hydroxypolyesters of acrylic acid and of methacrylic acid; also the esters and amides which contain amino groups and ammonium groups and belong to the polymerizing acids such as dialkylamino ester, in particular the dimethyl esters and the diethylaminoalkylic esters of acrylic acid and of methacrylic acid, as well as the trimethyl esters and the trimethylammoniumalkyl esters and the corresponding amides. The poly(meth)acrylates to be used according to the invention can consist exclusively of the above named monomers containing carboxylate groups or can be combined in a copolymerisate with monomers containing no carboxylate groups. In the copolymers, the rate of carboxylate monomers is at 90 to 10 mol percent, preferably at 60 to 30 mol percent.

In addition, monomers of little or no water solubility can be copolymerized in small amounts with the above named monomers, such as vinyl esters and the esters of acrylic acid and/or methacrylic acid with $C_1$–$C_{10}$ alcohols, styrol and alkylated styrols. In general, the proportion of water-insoluble monomers is about 80 to 100% by weight, related to the totality of monomers. As a rule, the water-insoluble (hydrophobic) monomers form 0 to 20% by weight of the monomers.

The acidic monomer components can be neutralized prior to polymerization, whereby the degree of neutralization is preferably between 10 and 95 mol percent, in particular between 50 and 90 mol percent, and especially between 70 and 95 mol percent. Bases used in neutralizaton can be any of the customary inorganic and organic compounds, preferably caustic soda solution, caustic potash solution and ammonia (ammonium hydroxide).

Together with the above named monomers, small amounts of cross-linking monomers are copolymerized with more than one reactive group in the molecule. This results in partially cross-linked polymerizates which are no longer soluble but only swellable in water. Among the cross-linking monomers that can be used are, for example, the following bifunctional or multifunctional monomers: amides such as methylenebisacrylic or methylenemethacrylic amide, allylic compounds such as allyl(meth)acrylate, alkoxylated allyl (meth)acrylate preferably reacted with 1 to 30 mol ethylene oxide, triallylocyanurate, maleic-acid diallyl ester, polyallyl ester, tetraallyloxiethane, triallylamine, tetraallylethylenodiamine, allyl ester of phosphoric or phosphorous acid, also cross-linking monomers such as N-methylol compounds of amides such as methacrylamide or acrylamide and the ethers derived therefrom, and esters of polyols and aixoxylated polyols such as diacrylates or triacrylates such as butanodiol or ethylenoglukolodiacrylate, polyglylkol-di-(meth)acrylate, trimethylolopropanotriacrylate, diacrylate and triacrylate esters of trimethylolopropane—preferably oxalkylated (ethoxylated) with 1 to 30 mol of alkylenoxide, acrylate ester and methacrylate ester of glycerin and pentaerythritol, as well as glycerin and/or pentaerythrite preferably oxethylated with 1 to 30 mol of ethylenoxide. Preferred are methylen or ethylenbis(meth)acrylamides, N-methylolacrylamides and triallylamine. The proportion of cross-linking comonomers is about 0.01 to 2.5% by weight, preferably about 0.01 to 1.0% by weight, and especially preferred about 0.01 to 0.1% by weight, related to the totality of monomers.

The polymers to be used according to the invention, which contain carboxylate groups, may contain water-soluble polymers as a graft base, whereby amounts of up to 30% by weight are preferred. These include partly or fully saponified polyvinyl alcohols, starch or starch derivatives, cellulose or cellulose derivatives, lignin or lignin derivatives, polyacrylic acid, polyglycols or their mixtures.

In a preferred embodiment, the polymers to be used according to the invention are subsequently cross-linked. For subsequent cross-linking, which leads to a clear improvement in gel stability, liquid absorption under pressure, and absorption velocity, compounds are used which as a rule have at least two functional groups and which can cross-link the functional groups of the polymerizate on the surface of the polymer particles. Preferred are alcohol, amine, aldehyde, glycidyl and epichlor functions, whereby cross-linking molecules with various functions can be used. The following are named as examples: ethylenoglykol, diethylene glycol, triethylene glykol, polyethylene glykol, glycerin, polyglycerin, propylene glykol, diethanolamine, triethanolamine, polypropylene oxide, block copolymers of ethylene oxide and propylene oxide, sorbitan fatty acid ester, trimethylol propane, ethoxylated trimethylol propane, pentaerythritol, ethoxylated pentaerythritol, polyvinyl alcohol, sorbite, ethylene carbonate, propylene carbonate and polyexpoxides such as ethylene glykol diglycidyl ether. Preferably, ethylene carbonate is used as a subsequent cross-inking agent. The subsequent cross-linking agent is used in amounts between 0.01 to 10% by weight, preferably 0.1 to 5% by weight, and especially 0.1 to 1% by weight related to the polymer to be subsequently cross-inked.

The poly(meth)acrylates to be used according to the invention can be produced by conventional means, but it is preferable to polymerize discontinuously in aqueous solubon in a polymerization vessel or continuously, for example on a continuous belt. Polymerization is initiated with customary initiators or redox systems which initiate radical polymerization. In a practically adiabatic polymerization process, an aqueous polymer gel is formed with an appropriate initial monomer concentration of 15 to 50% by weight. By selecting the initial monomer concentration and an appropriately low starting temperature in the range of 0 to 50° C., preferably between 5 and 25° C., polymerization can be such that the maximum temperature in the aqueous polymer gel that forms can be well controlled. After completed polymerization, the polymer gel is mechanically reduced in size, dried, ground and if need be subjected to surface cross-linking.

Also suitable for producing poly(meth)acrylates is the suspension polymerization method, in which the discrete polymer particles are formed already during polymerization.

When the surface cross-inking agents are added, it must be ensured that the polymer particles are well mixed. Some suitable mixing devices for applying the subsequent cross-linking agent are the Panterson-Kelley Mixer, the DRAIS Turbulence Mixer, the Lödige Mixer, the Ruberg Mixer, screw mixers, disk mixers and fluid-bed mixers as well as continuously operating vertical mixers in which the powder is mixed at a rapid frequency by means of rotating knives (Schugi Mixer). After the subsequent cross-linking agent, preferably in the form of a solution, has been mixed with the polymer particles, the subsequent cross-linking reaction takes place at temperatures of 80 to 250° C., preferably at 135 to 250° C., and especially at 150 to 200° C. The optimal period of subsequent heating can be easily determined for the individual cross-linking agents by means of a few experiments. It is limited by the point at which the desired characteristic profile of the super-absorber is again destroyed due to heat damage. For example, the cross-linking periods for a temperature of 180° are usually below 30 minutes.

The poly(meth)acrylates may also contain processing and conditioning aids such as potassium stearate, polyglykol, silicic acids, bentonite, etc.

The residual content of the poly(meth)acrylates to be used according to the invention is low and amounts to less than 1000 ppm, preferably less than 500 ppm, and especially less than 250 ppm. In particular, the residual amount of monomers such as acrylamide, which are of ecotoxicological concern, is preferably below 250 ppm.

The absorption capacity of the poly(meth)acrylates to be used according to the invention for water and aqueous solutions may fluctuate within a wide range and is determined by the monomer components, the cross-linking agents and in some cases the subsequent cross-linking agents.

Preferably, the poly(meth)acrylates used are those which absorb more than 30 g/g, preferably more than 50 g/g and especially more than 65 g/g of polymer in a synthetic soil solution with a conductivity of 2.5 $\mu$S. Per 10 liters of water, the synthetic soil solution contains 0.71 g NaCl, 0.065 g NaN$_3$, 1.676 g CCl, 0.353 g NH$_6$Cl, 3.363 g MgCl$_2$6H$_2$O, 10.5 g CaCl$_2$2H$_2$O and 0.010 g FeCl3 6H2O. In this solution, 1 g of poly(meth)acrylate is stirred with a magnetic stirrer for 15 minutes, allowed to stand for 45 minutes and then filtered over a 100 mesh sieve. The quotient of the absorbed amount of liquid and the weighed portion of polymer is the absorption value.

Copolymers of poly(meth)acrylates produced by using comonomers not containing carboxyl groups, especially acrylamide, have a higher long-term stability of absorption in terms of the frequently changing damp and dry phases during application.

The soluble components of the poly(meth)acrylates to be used according to the invention are usually below 20% by weight, preferably below 15% by weight, and especially below 10% by weight.

The particle-size distribution of the poly(meth)acrylates to be used may differ depending on the application, but normally it is in the 0.2 to 3 mm range.

Furthermore, the poly(meth)acrylates may be charged with active agents which they gradually release again into the environment in the course of application according to the invention. Among these agents are fertilizers, herbicides and pesticides.

The invention is described below in detail with reference to the following examples:

EXAMPLE 1

Sterile-germinated Scotch pine (Pinus sylvestris) seedlings were grown in a sterile reconstituted soil solution (Table 1) from the Solling region, to which lead and cadmium dioxide in concentrations were added, each at a rate of 1 μmol/liter.

TABLE 1

| Nutrient solution used, in μmol/liter |
| --- |
| $Ca^{2+}$: 130, $K^+$: 350, $Mg^{2+}$: 82, $Na^+$: 174, Fe3+: 10; $NO3^l$: 644, SO42–: 85, PO43–: 16, $Cl^l$: 154a |

The experimental plants were sterile-germinated on agar plates where they were grown until the cotyledons were fully developed. Subsequently they were transplanted into sterile hydrocultures which were kept under constant light conditions (photosynthetically active photon flow density of 170 μmol m-2s-1, at 16 hours of light/8 hours of darkness) and in a constant room climate (room temperature 22/20° C. day/night). The nutrient solution was changed weekly.

After a growing period of 4 weeks in the nutrient solution without additives, the plants were treated with Stockosorb® (Stockosorb® is a trademark of and a commercially available acrylamidelacrylic acid copolymer of the instant assigness Stockhausen GmbH & Co. KG, 25 Bäkerpfad, 47805 Krefeld, Germany) and heavy metals according to the design described below. During the treatment period, the nutrient solution was changed weekly.

In each experimental variant, 30 plants were used in three pots with 10 plants each. The individual pots were evaluated separately, and mean values were calculated for the individual pots as well as for the entire experimental variant. For the evaluation, the plants were photographed at the end of the experiment, the length of roots and shoots was measured, photosynthesis rates and dry weights of roots, shoots and needles were determined. The root was pulped, and the heavy-metal contents were determined in the atom absorption spectrometer (AAS).

Treatment Design

K-: Control, without heavy metals and without Stockosorb
K-Cd,Pb: Control with heavy metals, without Stockosorb
K-stock. 0.4%: Control with Stockosorb, without heavy metals
St. 0.04%: with 0.04% Stockosorb and heavy metals
St. 0.1%: with 0.1% Stockosorb and heavy metals
St. 0.4% with 0.4% Stockosorb and heavy metals It is clear that treatment with Stockosorb has eliminated the toxic effect of the heavy metals and that their absorption by the plants has been retarded. Similar results were also obtained in th same experiments with Aleppo pine and with a poplar species (Populus hupehensis).

EXAMPLE 2

Three-year old spruce in 12-liter containers were planted into a lead-contaminated loamy shale soil from the Hartz Mountains region, which had been treated with 0.6% Stockosorb K 400. Control experiments were planted simultaneously with untreated soil. The plants were kept outdoors from May to October; they were routinely watered with tap water.

Subsequently, the plants were exposed to a water-stress treatment, i.e. watering was stopped until the needles became gray and dropped.

Figure 5:
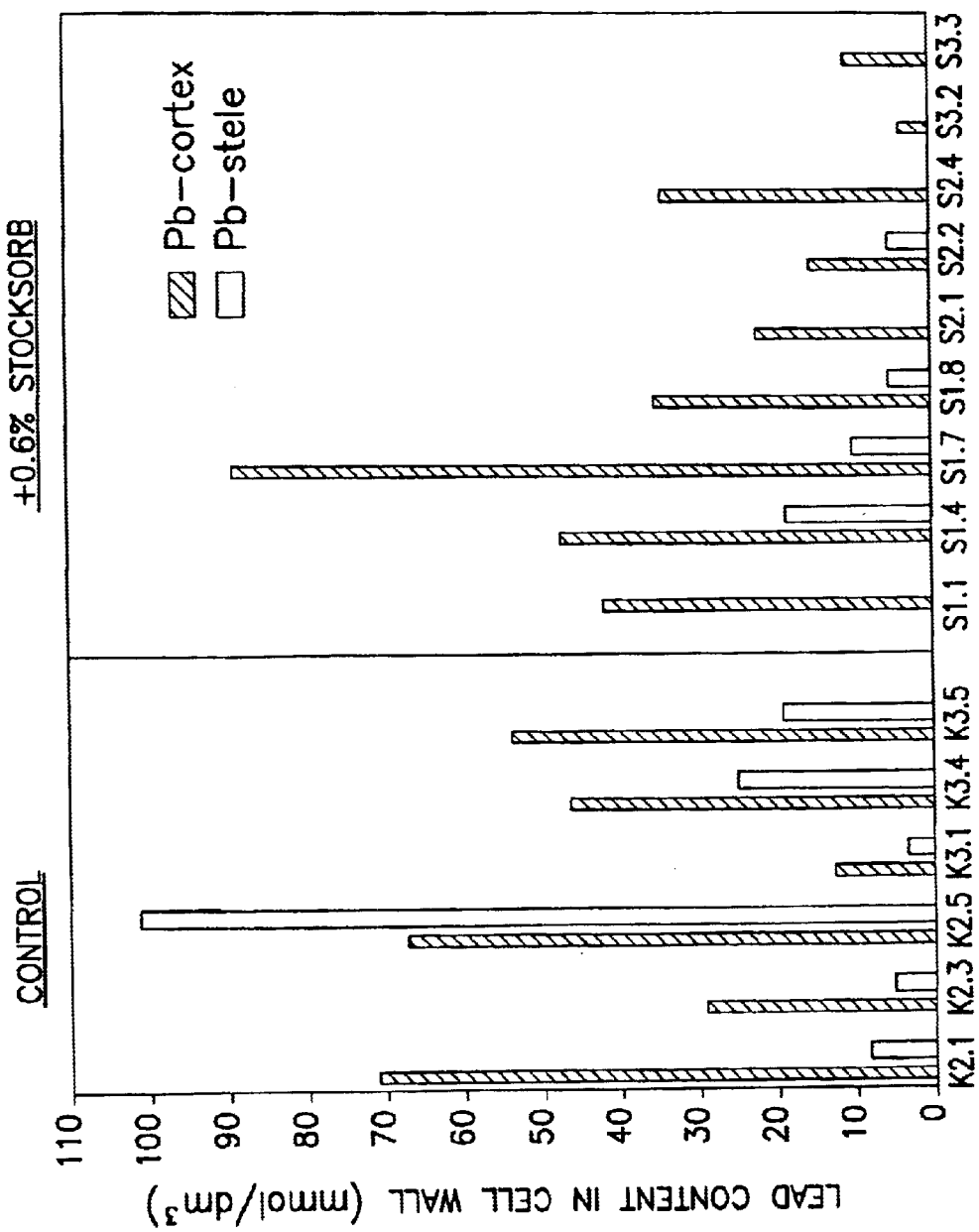
FIG. 5 shows the lead content in the cell wall.

From each treatment variant the fine roots of three different plants were removed and prepared for ion localization under the electron microscope (D. L. Godbold, E. Fritz, A. Huttermann: Aluminum toxicity and forest decline. Proc. Natl. Acad. Sci. USA 85,3888–3892 [1988]). FIG. 5 shows the analyses of lead contents in the cell walls of the root epidermis and the central cylinders (steles) of various roots. In the roots grown in the untreated soils, large amounts of lead were found in the cell walls of the cortex as well as in the stele (FIG. 5, Control). In the cell walls of the root epidermis of plants grown in the soils treated with Stockosorb, the lead content was lower (FIG. 5, +0.6% Stockosorb). Furthermore, considerably less lead was transported into the steles via the epidermis.

Stockosorb was effective even under very difficult conditions for the plants, when the soil was dried out and the ion concentration in the soil solution increased by at least one order of magnitude.

EXAMPLE 3

The roots of the plants in Example 2 were washed. As FIG. 6 shows, considerably more roots were formed in the soil treated with Stockosorb than by the plants growing in the control soils. As FIG. 7 shows, each of the five plants examined in the soils treated with Stockosorb had formed four times more root mass than those grown in the control soils.

What is claimed is:

1. A process for reducing the presence of heavy metals in plants growing in soil contaminated with heavy metals, comprising: applying to the contaminated soil where the plant grows a heavy metal reducing effective amount of a compound selected from the group consisting of cross-linked polyacrylates and polymethacrylates.

2. The process according to claim 1, wherein the soil is treated by mixing the compound into the soil.

3. The process according to claim 2, wherein the compound is added in the amount of 0.1 to 2.5% by weight.

4. The process according to claim 3, wherein the compound is added in the amount of 0.5 to 2.0% by weight.

5. The process according to claim 1, wherein the cross-linked poly(meth)acrylates are produced by a method comprising polymerizing monoethylenically unsaturated monocarboxylic acids.

6. The process according to claim 1, wherein the poly(meth)acrylates are produced by a method comprising polymerizing monoethylenically unsaturated monomers containing no carboxylate groups.

7. The process according to claim 5, wherein the poly(meth)acrylates are cross linked by a cross-linking agent selected from the group consisting of methylenbis(meth)acrylamide, ethylenbis(meth)acrylamide, N-methylolacrylamide, triallylamine and combinations thereof.

8. The process according to claim 5, wherein the poly(meth)acrylates are treated with a subsequent cross-linking agent in quantities of 0.01 to 10% by weight, at a temperature between 80 and 250° C.

9. The process according to claim 5, wherein monoethylenically unsaturated monocarboxylic acids are neutralized between 10 and 95 mol percent.

10. The process according to claim 5, wherein the poly(meth)acrylates have an absorption capacity for synthetic soil solution of more than 30 g/g of the poly(meth)acrylates.

11. The process according to claim 5, wherein the poly(meth)acrylates are worked into the contaminated soil up to a depth of about 50 cm.

12. The process according to claim 5, wherein the monocarboxylic acid is acrylic acid or its salts.

13. The process according to claim 6, wherein the monoethylenically unsaturated monomer is acrylamide.

14. The process according to claim 7, wherein the cross-linking agent is methylenebisacrylamide.

15. The process according to claim 9, wherein the monoethylenically unsaturated monocarboxylic acids are neutralized between 50 and 90 mol percent.

16. The process according to claim 10, wherein the absorption capacity is more than 50 g/g of the poly(meth)acrylates.

17. The process according to claim 10, wherein the absorporption capacity is more than 65 g/g of the poly(meth)acrylates.

* * * * *